Aug. 3, 1954 F. G. S. ENGLISH ET AL 2,685,409

MAGNETIC SENSING MEANS FOR STATISTICAL MACHINES

Filed March 18, 1952 6 Sheets-Sheet 1

INVENTORS

FRANCIS G. S. ENGLISH
MAURICE C. P. HEWITT BY

[signature]

ATTORNEY

Aug. 3, 1954 F. G. S. ENGLISH ET AL 2,685,409

MAGNETIC SENSING MEANS FOR STATISTICAL MACHINES

Filed March 18, 1952 6 Sheets-Sheet 2

INVENTORS
FRANCIS G. S. ENGLISH
MAURICE C. P. HEWITT
BY

ATTORNEY

Aug. 3, 1954 F. G. S. ENGLISH ET AL 2,685,409

MAGNETIC SENSING MEANS FOR STATISTICAL MACHINES

Filed March 18, 1952 6 Sheets-Sheet 3

INVENTORS
FRANCIS G. S. ENGLISH
MAURICE C. P. HEWITT
BY
ATTORNEY

Aug. 3, 1954 F. G. S. ENGLISH ET AL 2,685,409

MAGNETIC SENSING MEANS FOR STATISTICAL MACHINES

Filed March 18, 1952 6 Sheets-Sheet 4

INVENTORS
FRANCIS G. S. ENGLISH
MAURICE C. P. HEWITT
BY
ATTORNEY

MAGNETIC SENSING MEANS FOR STATISTICAL MACHINES

Filed March 18, 1952 6 Sheets-Sheet 5

INVENTORS
FRANCIS G. S. ENGLISH
MAURICE C. P. HEWITT
BY
ATTORNEY

Aug. 3, 1954 F. G. S. ENGLISH ET AL 2,685,409

MAGNETIC SENSING MEANS FOR STATISTICAL MACHINES

Filed March 18, 1952 6 Sheets-Sheet 6

INVENTORS
FRANCIS G. S. ENGLISH
MAURICE C. P. HEWITT
BY

ATTORNEY

Patented Aug. 3, 1954 2,685,409

UNITED STATES PATENT OFFICE 2,685,409

MAGNETIC SENSING MEANS FOR STATISTICAL MACHINES

Francis Guy Sydenham English, Corydon, Highwold, Chipstead, and Maurice Charles Paton Hewitt, Wokingham, England, assignors to Powers-Samas Accounting Machines Limited, London, England, a British company Application March 18, 1952, Serial No. 277,204

Claims priority, application Great Britain April 4, 1951

8 Claims. (Cl. 235—61.11)

This invention relates to statistical machines having means to feed record cards in succession past sensing means to sense data recorded thereon and to initiate impulses representative thereof which may condition for operation elements of the machine such, for example, as punches, type-carrying elements, or counter circuits.

According to the present invention there is provided in a statistical machine having means to feed record cards in succession past sensing means to sense data recorded thereon and to effect actuation of means to condition for operation elements of the machine such, for example, as punches, type-carrying elements, or counting circuits, apparatus including for each card column to be sensed a sensing head having a narrow-gapped ferro-magnetic cored inductor supported with its air gap in close proximity with the path through which is fed a record card on which data is recorded by marks formed with a marking material having ferro-magnetic properties whereby location of a mark across the air gap varies the electrical inductance of the sensing head to change the output voltage from its circuit, amplifier means to amplify the output voltage from said circuit, attenuating means in circuit with said sensing head and amplifier means and interposed therebetween to attenuate voltage variations other than that initiated by the location of a mark across said air gap, and actuator means for operation by said amplified voltage.

Figure 1:
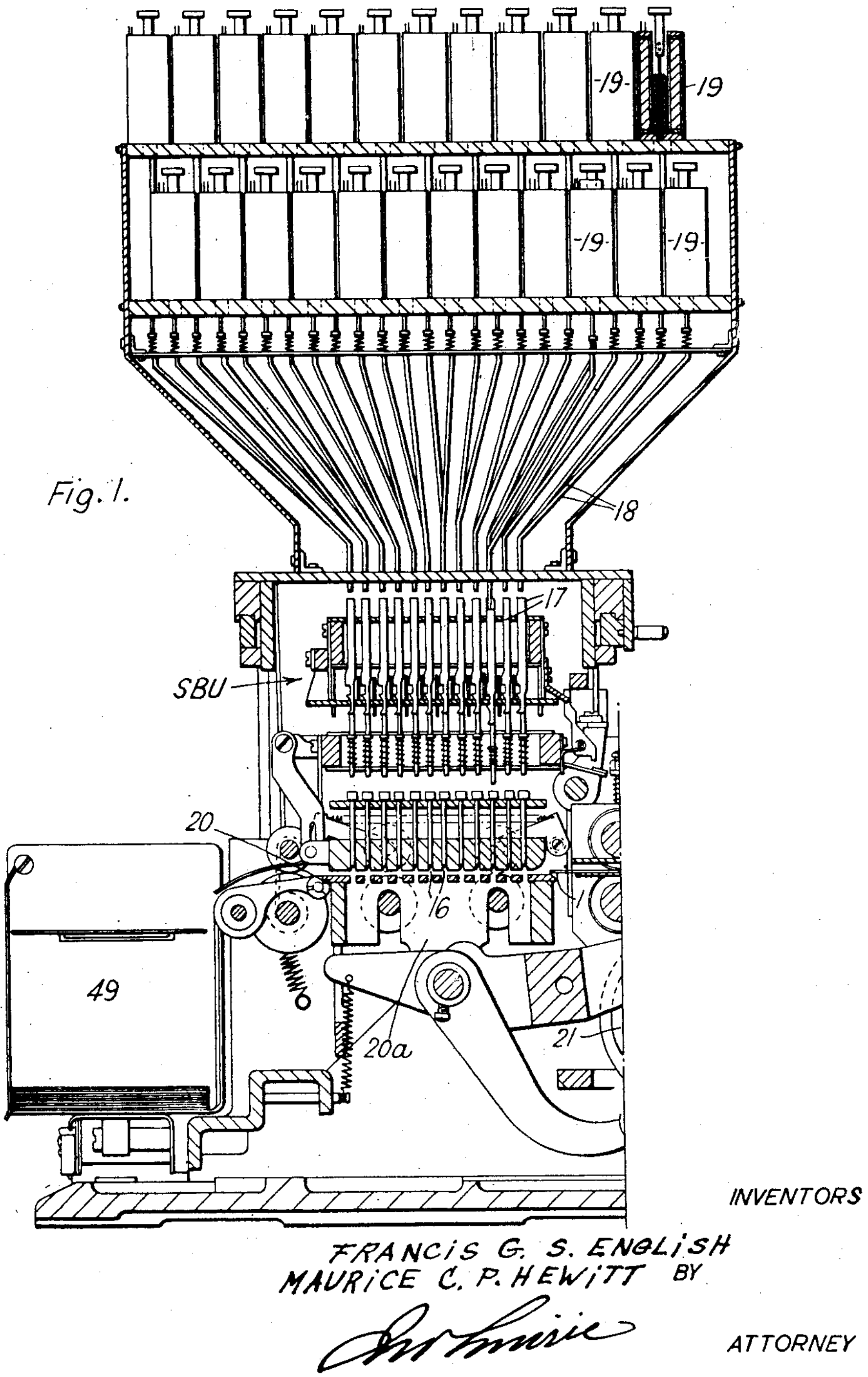
Figure 1A:
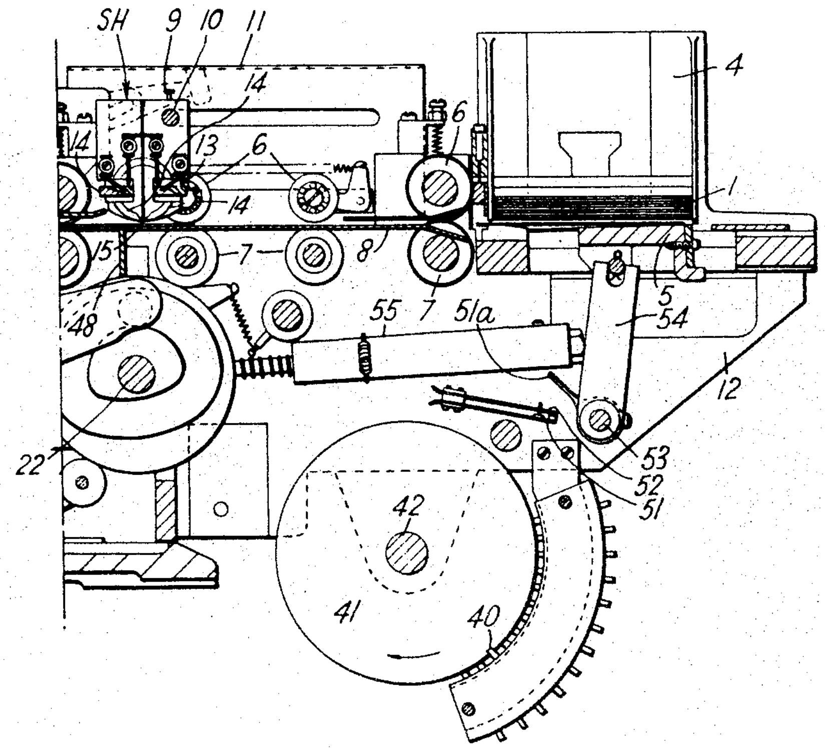
Figure 2:
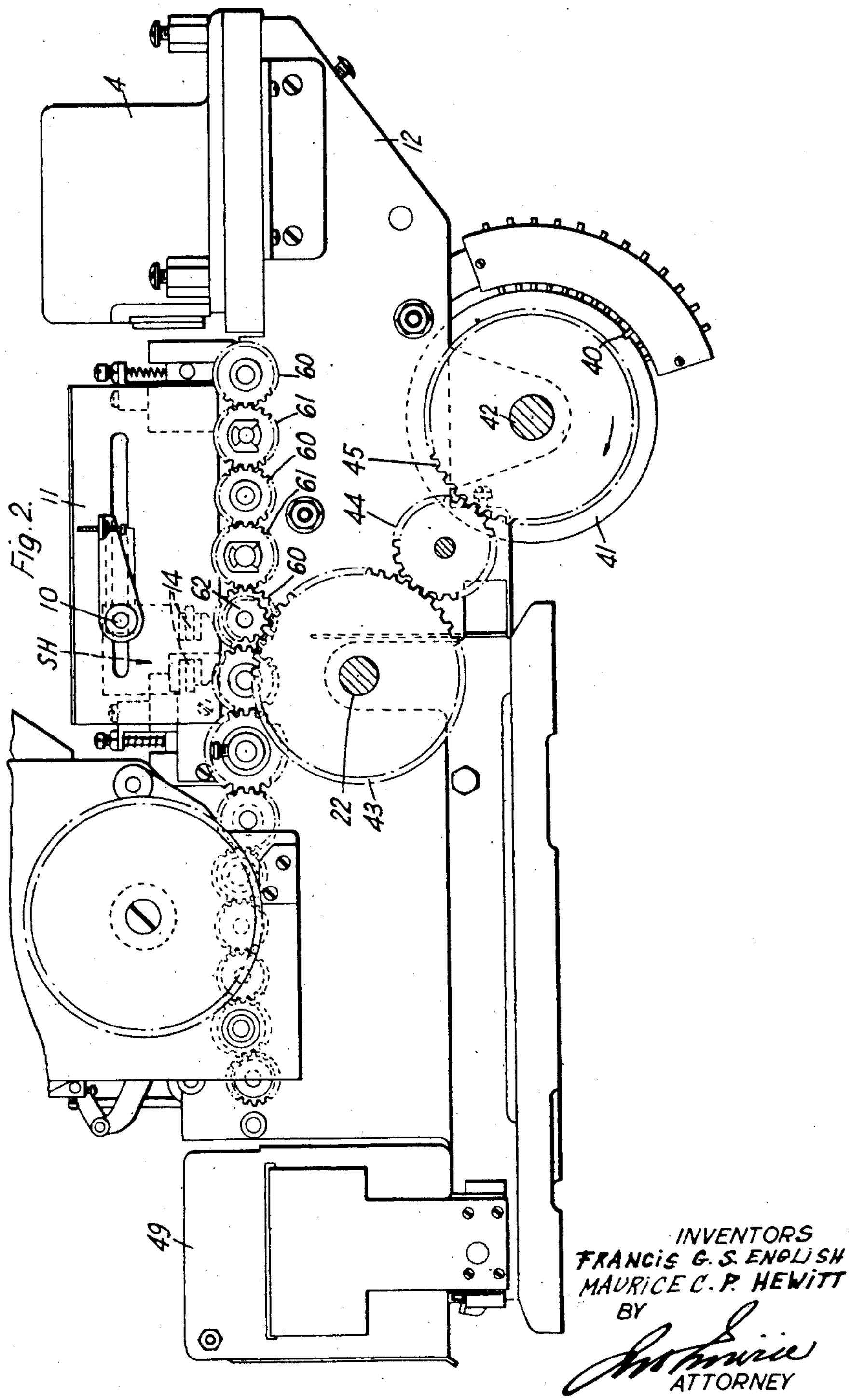
Figures 3, 4, 5, 7:
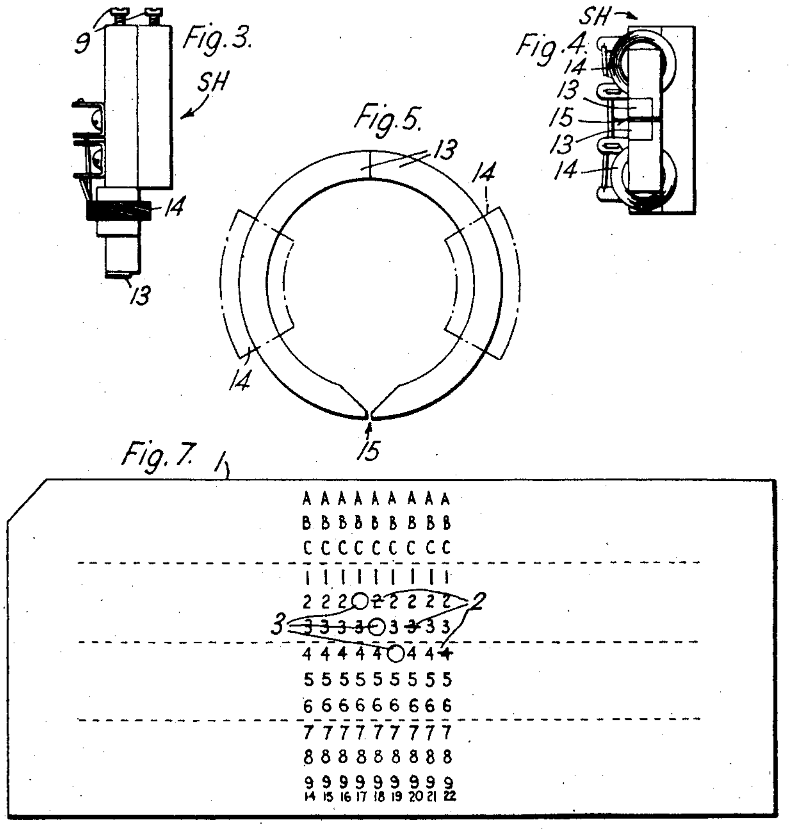
Figure 8:
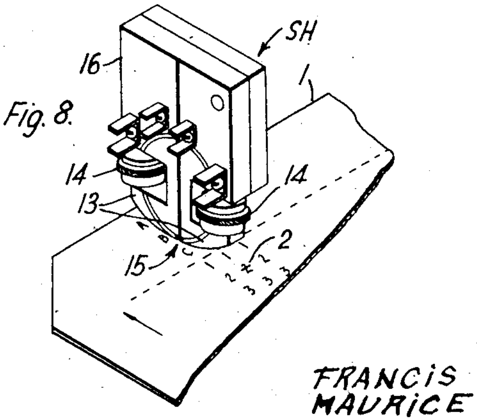
Figure 6:
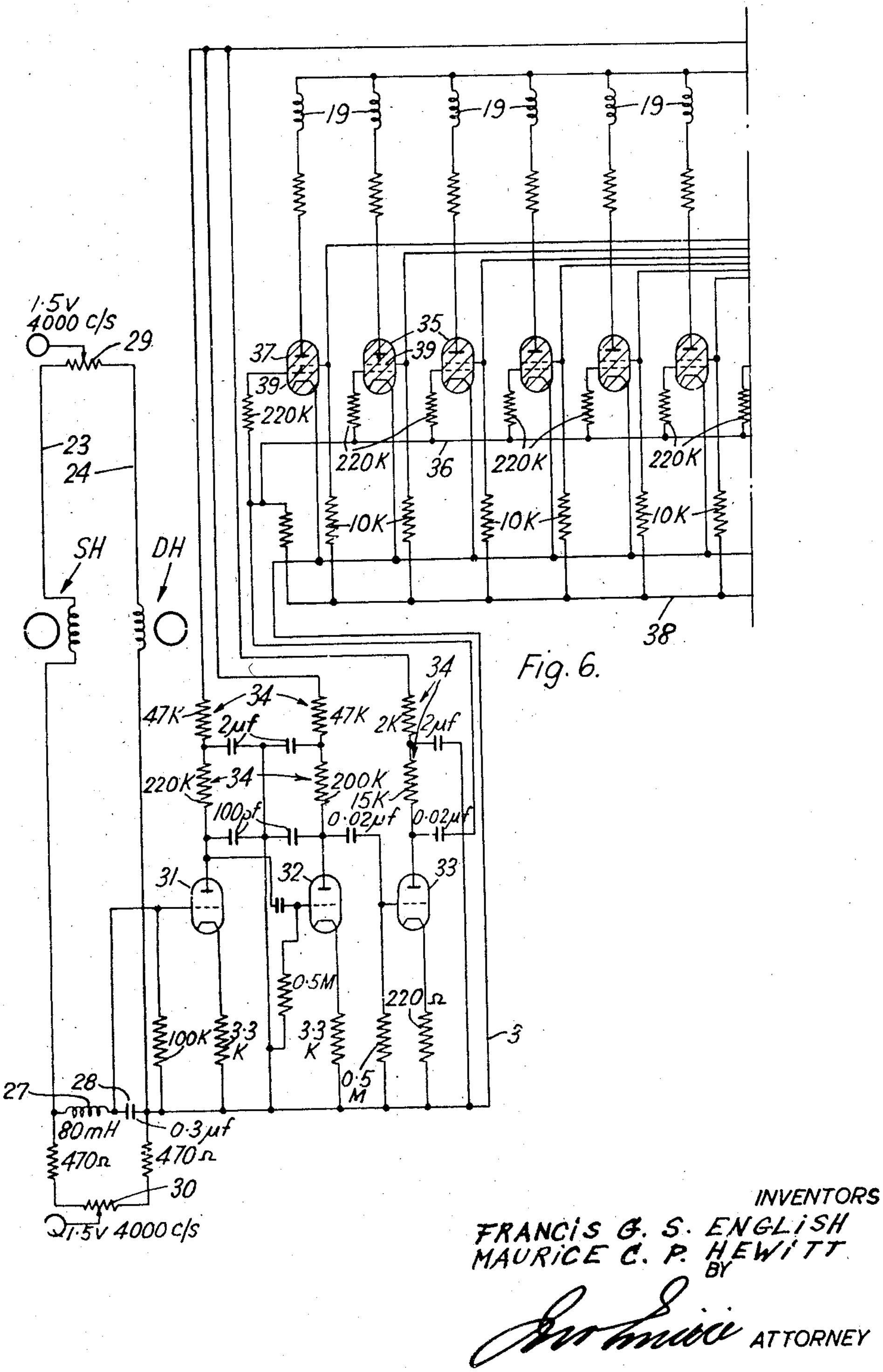
Figure 6A:
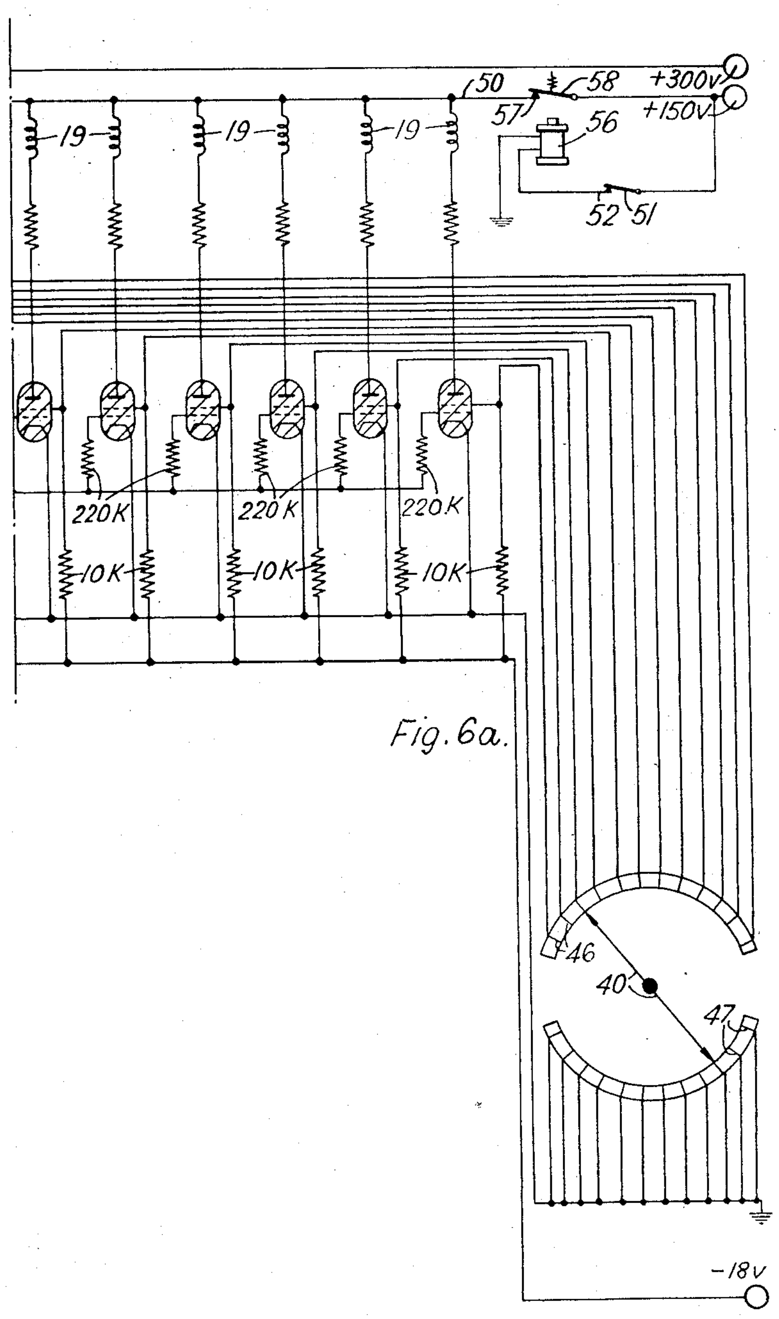

In order that the invention may be clearly understood one embodiment thereof will now be described, by way of example, with reference to the accompanying diagrammatic drawings in which:

Figs. 1A and 1B are together a longitudinal section through a machine arranged to sense record cards and to punch in the cards a representation of data so sensed, Fig. 2 is a side elevation of the bed portion of the machine and illustrates driving mechanism for certain of the parts thereof, Fig. 3 is an end view of a sensing head employed in the machine, Fig. 4 is a bottom plan of Fig. 3, Fig. 5 is a view, to an enlarged scale, of the iron core and coils of the sensing head, Figs. 6A and 6B are together a circuit diagram for sensing one column of a card and for operating solenoids for a column of punches appropriated thereto, Fig. 7 is a record card, showing some columns of data-indicating positions, having data-indicating marks applied thereto and illustrating the manner in which that data may be punched in the card, and Fig. 8 is a perspective view of a sensing head with a card in sensing relation thereto.

Referring to the drawings, data is recorded on a record card 1, Fig. 7, by marks 2 made by the use of a pen, pencil or other marking device, the marking material for which contains ferro-magnetic properties, for example the material contains magnetic iron oxide, or iron or nickel in finely powdered form. The marks thus made are such that when located beneath gapped ferro-magnetic cored inductors they are capable of causing variation of the electrical inductance thereof to change the output voltage of the inductor circuits and so provide electrical outputs which can be amplified for transmission to electrical circuits, shown in the drawing as solenoids, arranged to condition elements of a statistical machine, the elements being shown in Fig. 1 as punches to punch in the card holes 3 representative of the data sensed from the marks 2.

A pile of marked cards 1 is placed in a magazine 4, from the bottom of which they are fed one at a time by a reciprocating picker 5 which delivers the cards in succession to feed rollers 6, 7 arranged to feed the cards to and past a sensing position. The cards are moved by the rollers 6, 7 over a suport 8 made of electrically insulating material and the lower rollers 7 are driven by gears 60, idlers 61, pinions 62 and driving gear 43, Fig. 2.

At the sensing position are a plurality of sensing heads SH secured by clamping screws 9 to a rod 10 supported in slotted frames 11 secured to the main frames 12 of the machine. One sensing head is provided for each card column to be sensed and, as can be seen from Fig. 7, to provide for a margin of error in card marking and to permit the sensing heads to be of a reasonable size to facilitate manufacture thereof it is proposed that alternate card columns be sensed. By this arrangement, as can be seen from Figs. 7 and 8, a mark 2 can be of a length such as substantially to span the distance between two alternate columns. The holes punched as a result of the sensing operation can however, as is customary, be punched in adjoining card columns as illustrated in Fig. 7.

Each sensing head comprises a gapped ferro-magnetic cored inductor the core of which is substantially circular as can be seen in Fig. 5, but for convenience of manufacture the core is made in the form of two half-rings 13. The core is made from a suitable ferro-magnetic material, a preferred form being manufactured from the substance generally known as Ferrite Typical and sold under the trade name Ferroxcube, and each half-ring 13 has a coil 14 therearound. The half-rings 13 are so supported that a narrow air gap 15 is provided therebetween, the width of the air gap being of the order of 0.015 inch. The half-rings 13 are suitably retained in holders through which passes the rod 10. As can be seen from the drawings, the lower ends of the half-rings 13 are disposed to be in close proximity with the path through which the marked surface of the card 1 is passed.

Each sensing head co-operates with a column of punches 16 appropriated thereto the punches being conditioned for operation by a set-bar unit SBU comprising columns of set-bars 17 settable by transmission wires 18 actuated by solenoids 19 of which two columns are shown in the drawings. The set-bars 17 are, in known manner, retained in set position for a punching operation and as this is well understood in the art it will not be described herein, it being sufficient to state that, as is also well understood in the art, punching is effected by the raising of a die 20, with a card therein, operation of the die being effected by a carriage 20*a* arranged for vertical reciprocation by a cam 21 on the main shaft 22 of the machine. The solenoids 19 of a column are connected in an electric circuit, Fig. 6, there being twelve solenoids, one for each punch of a column, there being one punch for each data-indicating position in a card column.

It will be understood that a mark 2 is capable of producing only a very small change of inductance in a sensing head SH and to facilitate the detection of this change an alternating current bridge is employed. Referring to Fig. 6, it will be seen that the bridge consists of a pair of inductive arms 23, 24 and a pair of resistive arms 25, 26 and in a preferred embodiment is provided with 1.5 voltage alternating current at 4000 cycles. The sensing head SH is connected in the inductive arm 23 and in the inductive arm 24 is an identical head DH the purpose of which is to improve the stability of the bridge circuit by providing compensation for variations of inductance and resistance due to temperature changes, and by rendering the circuit substantially insensitive to changes in the voltage and frequency of the supply. To attenuate unwanted harmonics and to keep down the noise level in the balanced condition of the circuit a tuned acceptor filter 27, 28 is connected across the bridge. Balance of the bridge is obtained by the use of two adjustable potentiometers of which one 29 is connected between the inductive arms 23, 24 and the other 30 is connected between the resistive arms 25, 26 of the bridge.

To obtain a voltage from the head SH sufficient to overcome the standing bias on the grid of a gas-filled tetrode valve thus allowing it to conduct and effect operation of a solenoid 19 connected therewith a three-stage amplifier is employed. The amplifier consists of three triode valves 31, 32, 33 of which the first stage valve 31 is connected to the capacitive side of the filter 27, 28. The gain per stage is reduced by cathode resistors 34 to obtain the desired overall amplification and to improve stability.

As shown in Figs. 6A and 6B for each column of punches there are provided twelve solenoids 19 each operated by a gas-filled tetrode valve 35, individual thereto. So that an amplified output from the bridge shall operate the solenoid corresponding to the marked data-position sensed by the head SH, the amplified output is passed along a line 36 common to all the tetrodes 35 and the control grids 37 of the tetrodes are connected in parallel to line 36 and are normally biased back to minus 18 volts by negative potential passed along a line 38. The screen grids 39 of the tetrodes are also in parallel and normally biased by a potential from the line 38 so that until they are conditioned for firing, as described below, they will not fire on the application of potential to their control grids.

The tetrodes are successively and consecutively conditioned for firing by a rotary switch comprising a contact 40 on a disc 41 rotatable with a shaft 42 driven in timed relation with the feed rollers 6, 7 from the main shaft 22 by gearing 43, 44, 45, Fig. 2. The contact 40 is successively and consecutively engaged with pairs of carbon brushes 46, 47, Fig. 6, of which the brushes 46 are connected one each to a screen grid 39. Thus as a card 1 is moved beneath the sensing heads SH, as indicated in Figs. 1 and 8, the contact 40 and brushes 46, 47 successively and consecutively connect to earth the screen grids 39 of the tetrodes 35 and so condition the valves 35 one after the other, starting from the left of Fig. 6, for firing. Accordingly, the amplified output applied to line 36 will fire any valve 35 so conditioned and thus effect operation of the solenoid 19 connected therewith. It will, therefore, be understood that during the passage of a card past the sensing head SH, in the card column sensed thereby one or more marks can be sensed and the corresponding punches 16 set by their solenoids 19. To ensure synchronisation of the card with the contact 40 a card stop 48 is, in known manner, operated by a cam, not shown, on the main shaft 22 momentarily to arrest the leading edge of the card 1 beneath the sensing heads SH so that the first row of data-indicating positions are in sensing relation with the sensing heads SH. When the contact 40 is engaging the first pair of brushes 46, 47, the stop 48 is lowered to permit the continued passage of the card past the sensing heads SH to the die 20 supported by the carriage 20*a* whereby the card is raised for punching by the set punches 16.

After a card has been punched it is delivered into a receiver 49 and the set-bar unit is cleared of its setting in known manner. The solenoids 19 and relay valves 35 are de-energised by disconnecting the supply to line 50, Figs. 6A, 6B, by means of switch contacts 51, 52 through which the supply passes to a relay coil 56 which holds closed a pair of contacts 57, 58. This switch is opened as the die 20 commences to rise, the set bar unit SBU retaining its setting until cleared after punching. The switch is actuated by an operating arm 51*a* which is movable with a rocking shaft 53 by which the picker 5 is operated through arms 54 and an eccentric strap 55 operated by an eccentric, not shown, on the main shaft 22. The timing of the machine is such that when a first card is being ejected from the punch unit a second card is being moved past the sensing heads SH and a third card is being fed from the magazine 4 by the picker 5. Accordingly the switch contacts 51, 52 are separated by the operating arm 51*a* at about the time when the first card has just reached the punch unit and the second card is just reaching the second set of feed rollers 6, 7.

Figs. 6A, 6B illustrate a circuit which in practice has been found satisfactory and for convenience the values of resistors and capacitors employed therein have been shown in Figs. 6A, 6B. It will, however, be readily understood that modifications to the circuit shown may be made to suit particular requirements.

In an alternative embodiment of the invention, instead of one solenoid being provided for each punch of a column, as described above, one solenoid only may be provided for each column of punches the solenoids being supported on a carrier common thereto, the carrier being mounted for reciprocation lengthwise of the columns of set bars, movement of the carrier being effected in timed relation with the movement of the card past the sensing position so that as a particular card data-indicating position is located in sensing position, the solenoids are disposed above the set bars corresponding to those columnar data-indicating poistions. Thus, if the tetrode associated with a particular solenoid is "fired" the solenoid will be in the appropriate position to condition the punch corresponding to the data-indicating position being sensed.

If desired, holes representative of sensed data may be punched in a card different from that in which the sensing was made and when this is done there is provided, in association with the punching device, a magazine of known form including means to feed cards one at a time from the bottom thereof to a card chamber or die associated with the punches. To effect a punching operation, the punches may be moved relative to a card in the die or, as is well known in the art, the die chamber, together with the card therein, may be moved relative to the punches to effect a punching operation.

If desired, however, holes representative of sensed data may be punched in the card from which the data is sensed the punching being effected either in the field from which the data is sensed or in a different field on the same card. This, of course, will be well understood by those skilled in the art.

The electrical circuit shown in Figs. 6A, 6B may be modified, for example, the coils of the sensing head SH may be disposed in conjunction with resistors, capacitors, and inductors so that as the inductance of the windings changes when a ferro-magnetic data-indicating mark 2 is disposed beneath the air-gap 15, the circuit will be tuned to approach resonance for a given oscillation or alternatively detuned from resonance with such oscillation. These changes in circuit conditions may be utilised by means known to those skilled in the art to provide a voltage suitable for application to the grid of a gas-filled tetrode valve to actuate a selected solenoid or other circuit as described above.

It will also be understood that, if desired, the tetrodes 35 may be replaced by relays and in such a construction the relays may be spring returned with an electrical holding circuit cleared by the make-and-break switch 51, 52 described to control the input to the tetrode circuit.

In the foregoing description the amplified voltages, initiated by the sensing head SH, have been described as operating punches; it will, however, be readily understood by those skilled in the art that the amplified voltages may be utilised to initiate operation of other elements of statistical machines, for example, they may initiate actuation of the timing devices of sorting machines, or of the type carrying elements of machines such as tabulators, or of the circuits of electronic computors.

We claim:

1. In a statistical machine having means to feed record cards in succession past sensing means to sense data recorded thereon and to effect actuation of means to condition for operation elements of the machine such as punches, type-carrying elements, or counting circuits, apparatus including for each card column to be sensed a balanced electrical bridge comprising a pair of inductive arms and a pair of resistive arms, a sensing head connected in one of said inductive arms and having a narrow-gapped ferro-magnetic cored inductor supported with its air gap in close proximity with the path through which is fed a record card on which data is recorded by marks formed with a marking material having ferro-magnetic properties whereby location of a mark across the air gap varies the electrical inductance of the sensing head to change the output voltage from the bridge, an identical head connected in the other of the inductive arms, amplifier means to amplify the output voltage from the bridge, and actuator means for operation by said amplified voltage.

2. Apparatus according to claim 1, including a bridge balancing adjustable potentiometer connected between the arms of each said pair.

3. In a statistical machine having means to feed record cards in succession past sensing means to sense data recorded thereon and to effect actuation of means to condition for operation elements of the machine such as punches, type-carrying elements, or counting circuits, apparatus including for each card column to be sensed a balanced electrical bridge comprising a pair of inductive arms and a pair of resistive arms, a sensing head connected in one of said inductive arms and having a narrow-gapped ferro-magnetic cored inductor supported with its air gap in close proximity with the path through which is fed a record card on which data is recorded by marks formed with a marking material having ferro-magnetic properties whereby location of a mark across the air gap varies the electrical inductance of the sensing head to change the output voltage from the bridge, an identical head connected in the other of the inductive arms, a bridge balancing adjustable potentiometer connected between the arms of each said pair, a tuned acceptor filter connected across the bridge to accept the fundamental frequency, amplifier means connected to the capacitive side of the filter to amplify the output voltage from the bridge, and actuator means for operation by said amplified voltage.

4. In a statistical machine having means to feed record cards in succession past sensing means to sense data recorded thereon and to effect actuation of means to condition for operation elements of the machine such as punches, type-carrying elements, or counting circuits, apparatus including for each card column to be sensed a balanced electrical bridge comprising a pair of inductive arms and a pair of resistive arms, a sensing head connected in one of said inductive arms and having a narrow-gapped ferro-magnetic cored inductor supported with its air gap in close proximity with the path through which is fed a record card on which data is recored by marks formed with a marking material having ferro-magnetic properties whereby location of a mark across the air gap varies the electrical inductance of the sensing head to change the output voltage from the bridge, an identical head connected in the other of the inductive arms, a bridge balancing adjustable potentiometer connected between the arms of each said pair, a tuned acceptor filter connected across the bridge to accept the fundamental frequency, amplifier means connected to the capacitive side of the filter to amplify the output voltage from the bridge, an element conditioning electrical circuit for each data-indicating position in a card column, a gas-filled tetrode valve for each said conditioning circuit, the anode of each valve being connected to the conditioning circuit appropriated thereto, the control grids of the valves being connected in parallel to a line common thereto and to the output side of the amplifier means and the screen grids of the valves being connected in parallel to be normally biased by a negative voltage to prevent premature firing of the valves, and a rotary switch operable in timed relation with the card feeding means to connect the screen grids to earth successively and in consecutive order.

5. In a statistical machine having means to feed record cards in succession past sensing means to sense data recorded thereon and to effect actuation of means to condition for operation elements of the machine such as punches, type carrying elements, or counting circuits, apparatus including for each card column to be sensed a balanced electrical bridge comprising a pair of inductive arms and a pair of resistive arms, a sensing head connected in one of said inductive arms and having a narrow-gapped ferro-magnetic cored inductor supported with its air gap in close proximity with the path through which is fed a record card on which data is recorded by marks formed with a marking material having ferro-magnetic properties whereby location of a mark across the air gap varies the electrical inductance of the sensing head to change the output voltage from the bridge, an identical head connected in the other of the inductive arms, a bridge balancing adjustable potentiometer connected between the arms of each said pair, a tuned acceptor filter connected across the bridge to accept the fundamental frequency, amplifier means connected to the capacitive side of the filter to amplify the output voltage from the bridge, a solenoid for each data-indicating position in a card column, a gas-filled tetrode valve for each said solenoid, the anode of each valve being connected to the solenoid appropriated thereto, the control grids of the valves being connected in parallel to a line common thereto and to the output side of the amplifier means and the screen grids of the valves being connected in parallel to be normally biased by a negative voltage to prevent premature firing of the valves, a rotary switch operable in timed relation with the card feeding means to connect the screen grids to earth successively and in consecutive order, and a reset switch operable in timed relation with the card feeding means to effect resetting of the solenoids and tetrodes.

6. In a statistical machine having means to feed record cards in succession past sensing means to sense data recorded thereon and to effect actuation of means to condition for operation elements of the machine such, for example, as punches, type-carrying elements, or counting circuits, apparatus including for each card column to be sensed a sensing head having a narrow-gapped ferro-magnetic cored inductor supported with its air gap in close proximity with the path through which is fed a record card on which data is recorded by marks formed with a marking material having ferro-magnetic properties whereby location of a mark across the air gap varies the electrical inductance of the sensing head to change the output voltage from its circuit, amplifier means to amplify the output voltage from said circuit, attenuating means in circuit with said sensing head and amplifier means and interposed therebetween to attenuate voltage variations other than initiated by the location of a mark across said air gap, an element conditioning electrical circuit for each data-indicating position in a card column, a circuit determining element electrically connected to each said conditioning circuit, said circuit determining elements being connected in parallel to a line common thereto and to the output side of the amplifier means, and switch means operable in timed relation with the card feeding means to condition said circuit determining means successively and in consecutive order for actuation by an impulse applied to said common line.

7. In a statistical machine having means to feed record cards in succession past sensing means to sense data recorded thereon and to effect actuation of means to condition for operation elements of the machine such as punches, type-carrying elements, or counting circuits, apparatus including for each card column to be sensed a balanced electrical bridge comprising a pair of inductive arms and a pair of resistive arms, a sensing head connected in one of said inductive arms and having a narrow-gapped ferro-magnetic cored inductor supported with its air gap in close proximity with the path through which is fed a record card on which data is recorded by marks formed with a marking material having ferro-magnetic properties whereby location of a mark across the air gap varies the electrical inductance of the sensing head to change the output voltage from the bridge, an identical head connected in the other of the inductive arms, amplifier means to amplify the output voltage from the bridge, an element conditioning electrical circuit for each data-indicating position in a card column, a circuit determining element electrically connected to each said conditioning circuit, said circuit determining elements being connected in parallel to a line common thereto and to the output side of the amplifier means, and switch means operable in timed relation with the card feeding means to condition said circuit determining means successively and in consecutive order for actuation by an impulse applied to said common line.

8. Apparatus according to claim 7, including a bridge balancing adjustable potentiometer connected between the arms of each said pair.

References Cited in the file of this patent

UNITED STATES PATENTS

| Number | Name | Date |
|---|---|---|
| 2,116,314 | Jenkins et al. | May 3, 1938 |
| 2,302,002 | Bryce | Nov. 17, 1942 |
| 2,375,307 | Lake et al. | May 8, 1945 |
| 2,540,654 | Cohen et al. | Feb. 6, 1951 |
| 2,633,564 | Fleming, Jr. | Mar. 31, 1953 |